United States Patent [19]
Burton

[11] Patent Number: 5,470,118
[45] Date of Patent: Nov. 28, 1995

[54] SHEAR DEVICE FOR WELL SERVICE TOOLS

[76] Inventor: James E. Burton, 408 Elizabeth La., McCook, Nebr. 69001

[21] Appl. No.: 212,599

[22] Filed: Mar. 11, 1994

Related U.S. Application Data

[63] Continuation-in-part of Ser. No. 984,987, Dec. 2, 1992, abandoned.

[51] Int. Cl.⁶ .................................................. E21B 31/12
[52] U.S. Cl. ............................................ 294/86.18; 403/2
[58] Field of Search .............................. 294/86.1, 86.17, 294/86.18, 86.22; 175/301; 285/1, 2, 3, 304; 403/2, DIG. 3; 166/178

[56] References Cited

U.S. PATENT DOCUMENTS

| | | | |
|---|---|---|---|
| 2,128,102 | 8/1938 | Sherman | 294/86.18 |
| 2,296,397 | 9/1942 | Muhlbach | 294/116 |
| 2,605,131 | 7/1952 | Marshall et al. | |
| 2,908,525 | 10/1959 | Jones | |
| 3,327,784 | 6/1967 | Pardue | |
| 3,329,450 | 7/1967 | Current | 403/2 |
| 3,922,104 | 11/1975 | McCullough | 403/2 |
| 4,016,796 | 4/1977 | Brannan | 403/2 X |
| 4,127,297 | 11/1978 | Dufrene | 294/86.2 |
| 4,275,786 | 6/1981 | Lee | 294/86.17 X |
| 4,332,410 | 6/1982 | Baker | 294/86.18 |
| 4,411,546 | 10/1983 | Fischer | 403/2 X |
| 4,445,572 | 5/1984 | Fineberg et al. | 166/188 |
| 4,475,839 | 10/1984 | Strandberg | 403/2 |
| 4,558,895 | 12/1985 | Tamplen | 294/86.18 |
| 4,913,229 | 4/1990 | Hearn | 285/3 X |
| 5,066,060 | 11/1991 | Cooksey et al. | 294/86.18 |

*Primary Examiner*—Dean Kramer
*Attorney, Agent, or Firm*—John E. Reilly

[57] ABSTRACT

A shear device for a well service tool which is suspended from a sandline into a producing well and which device includes a plurality of shear rods which can be interchangeably connected between coupling members at opposite ends of the shear device and an outer stabilizing sleeve disposed in sealed relation between the coupling members in such a way as to stabilize the rod and assure that tensile loads are applied directly to the shear rod. Each shear rod is weakened along a shear section intermediately of the rod, or which is offset toward the upper end of the rod in order to reduce the overall length of the rod.

11 Claims, 2 Drawing Sheets

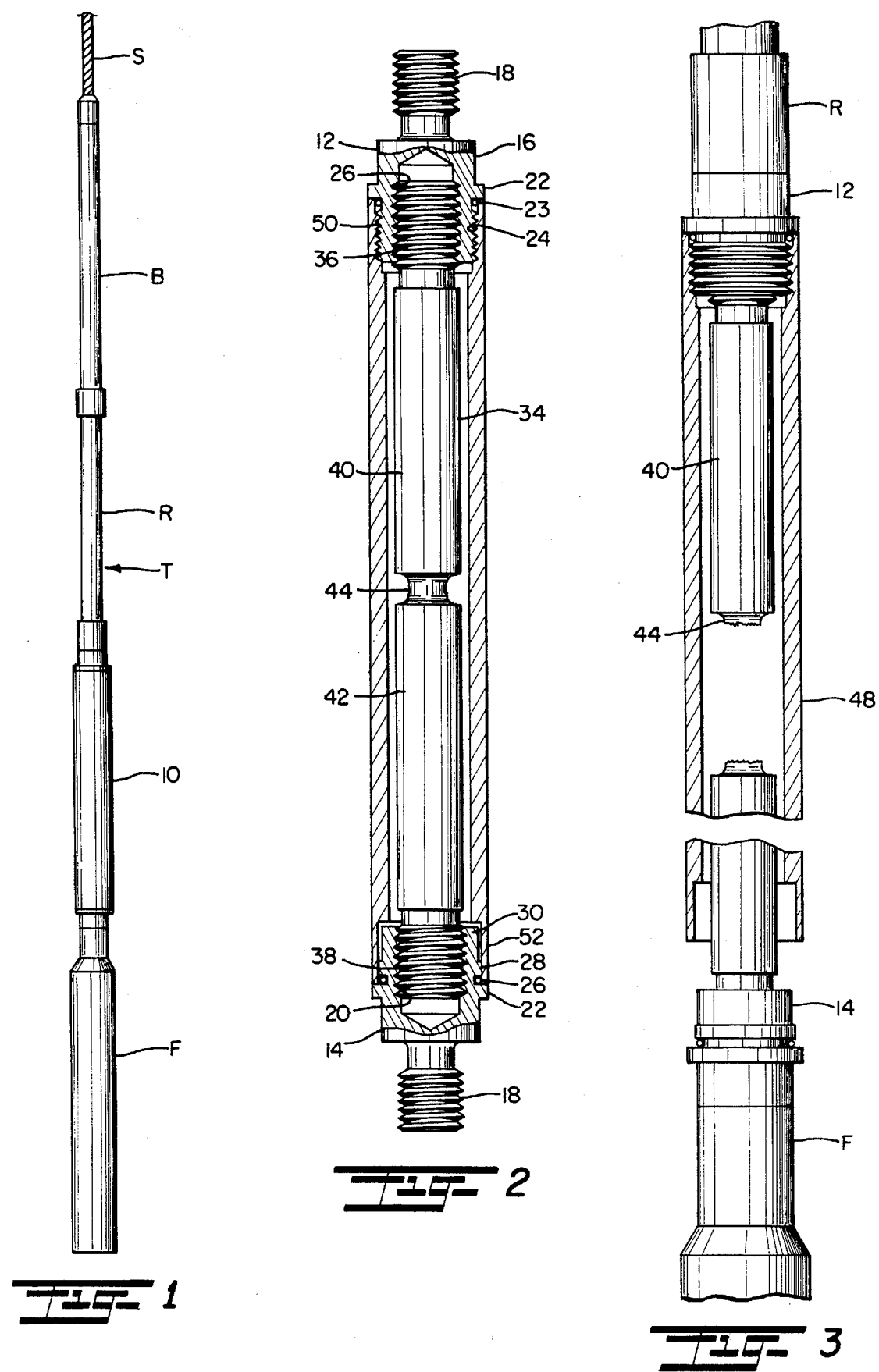

SHEAR DEVICE FOR WELL SERVICE TOOLS

CROSS-REFERENCE TO RELATED APPLICATIONS

This application is a continuation-in-part of Ser. No. 984,987, filed 2 Dec., 1992 for SHEAR DEVICE FOR WELL SERVICE TOOLS, by James E. Burton now abandoned.

BACKGROUND AND FIELD OF INVENTION

This invention relates to a shear device for well service tools; and more particularly relates to a novel and improved shear device for disposition in a sandline and rod fishing tool whereby to prevent excess strain and loss of sandline.

In producing wells, it is often desirable to service the well with a sandline having a fishing tool which can be run down the production string to retrieve other tools. However, should the fishing tool become stuck and too much lifting force is applied, it can rupture the sandline thereby resulting in loss of extended lengths of the line and time-consuming and costly repair and replacement.

In the past, shearing devices have been employed in downhole operations, such as, for example, a pulling tool for retrieving well tools from a well bore as disclosed in U.S. Pat. No. 4,558,895 to J. W. Tamplen. In Tamplen, however, the shear pins are positioned within the tool itself and could not be effectively employed in a producing well. A similar approach is taken in U.S. Pat. No. 5,066,060 to A. G. Cooksey et al in which emergency shear screws and lockout lugs are employed in combination to permit withdrawal of a running tool in the event that an excessive force is applied. U.S. Pat. No. 4,445,572 to D. H. Fineberg et al discloses the use of a shear ring employed as a part of an unrestricted bore safety joint; and in U.S. Pat. No. 3,327,784 to G. H. Pardue an arrangement is provided for applying a hammering action to cause a plunger to shear a shear pin in the event that a fish is frozen in a well bore. U.S. Pat. No. 4,411,546 to Fischer discloses a shear tool for oil well sucker rods in which an elongated rod with a shear section is sealed within a sleeve to prevent deflection of the shear section but does not afford adequate sealing between the sleeve and shear section; and since the sleeve is not positively attached to the upper portion of the shear rod there is no assurance that the sleeve will be removed with the severed upper portion of the shear rod in the event of rupture when being extracted out of the hole, particularly if the sleeve is forced to pass through oil, scale, water and other foreign materials in the well as it is being extracted. Other representative patents in this field are U.S. Pat. Nos. 2,296,397 to A. Muhlbach, 2,605,131 to S. Marshall et al, 2,908,525 to E. N. Jones, 4,127,297 to A. Dufrene, 4,275,786 to A. G. Lee and 4,332,410 to J. R. Baker but which are largely concerned with cased hole and electrical wireline tools but not with well service tools for pumping wells.

There is a need for a shear device which can be directly incorporated into a sandline and which will, in response to a predetermined tensile force or load, rupture at the end of the line above the fishing tool in order to prevent loss of the sandline. An outer protective sleeve is so connected to the upper portion of the shear tool and sandline as to assure retrieval of the sleeve with the upper portion of the tube in a single fishing operation; and a novel and improved seal assembly at opposite ends of the sleeve will prevent seepage between the sleeve and shear rod which would otherwise destroy the integrity of the tool.

SUMMARY OF THE INVENTION

It is therefore an object of the present invention to provide for a novel and improved shear device which can be readily assembled and directly incorporated into a sandline for use in pumping or producing wells.

Another object of the present invention is to provide for a novel and improved shear device for fishing tools which is easy to assemble, simple and durable in construction; and specifically wherein the shear device has a predetermined but adjustable shear limit so as to rupture when a predetermined axial or longitudinal load is applied thereto.

A still further object of the present invention is to provide for a novel and improved shear tool in which the majority of the tool is retrievable in the event of rupture in a single fishing operation and is therefore reusable in future operations; and further wherein a shear section is fully protected against exposure to fluids and other foreign matter in the well which could otherwise impede effective operation of the shear tool.

An additional object of the present invention is to provide for a novel and improved shear device having shear sections which are readily interchangeable to establish different predetermined load limits in a well service tool.

In accordance with the present invention, a shear device is provided for insertion into a well service tool to be suspended from a sandline into a producing well and which device includes coupling members at opposite ends, each of the coupling members having an internal rod-engaging member, and a shear rod having opposite ends affixed to one of the rod-engaging members, the rod including an intermediate, weakened portion which is rupturable under a predetermined load to separate the tool from the sandline. Preferably, the shear device also includes an outer elongated sleeve member which is interpositioned between the coupling members but is positively attached only to one of the coupling members so that the rod itself is fully responsive to and will bear the full thrust of any tensile loads applied to the tool. In a modified form of invention, the overall length of the shear rod is shortened by placing the shear section at or immediately adjacent the upper end while leaving sufficient length of the shear rod below the shear section so that in the event of rupture the longer section can be gripped to extract from the hole with a suitable retrieval tool. Locking elements are provided between threaded ends of the shear rod and end caps to which they are attached to prevent accidental shifting or loosening of the end caps with respect to the shear rods as well as to serve as an indicator to prevent inadvertent reuse of those shear tools that are designed for one-time use.

The above and other objects of the present invention will become more readily appreciated and understood from a consideration of the following detailed description of preferred and modified forms of the present invention when taken together with the accompanying drawings in which:

BRIEF DESCRIPTION OF THE DRAWINGS

FIG. 1 is an assembly view of a preferred form of shear device inserted between a sandline and fishing tool;

FIG. 2 is an enlarged view partially in section of the preferred form of shear device in accordance with the present invention;

FIG. 3 is another view partially in section illustrating the shear device when separated by a tensile load applied thereof;

DETAILED DESCRIPTION OF PREFERRED EMBODIMENT

Figure 4:
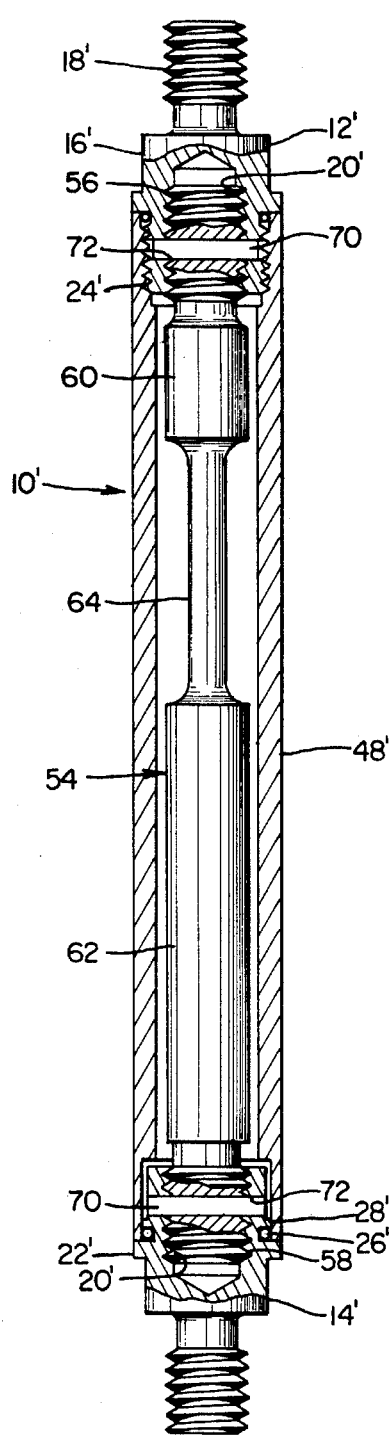
FIG. 4 is an enlarged view partially in section of a modified form of shear device in accordance with the present invention.

Referring to the drawings, there is shown by way of illustrative example in FIG. 1 a well service tool designated at T which is adapted to be run into a completed well by means of a sandline S. For the purpose of illustration and as a setting for the present invention, the tool T typically may be made up of a rod fishing tool F, weighted members in the form of a sinker bar B, conventional rod jars R, and a preferred form of shear device 10 is inserted in end-to-end relation to the rod jars R and lower fishing tool F. Accordingly, when the fishing tool is run down a production string of a completed well to retrieve other tools, the shear device 10 of the present invention is so constructed and arranged as to rupture under a predetermined tensile load so as to avoid application of excessive loads on the sandline. In other words, the shear device 10 will completely separate or sever the upper sections of the tool assembly T from the fishing tool F so that the sandline S, sinker bar B and rod jar R can be retrieved from the well without loss of any portion of the sandline.

Considering in more detail the preferred form of shear device as illustrated in FIGS. 2 and 3, the device 10 is comprised of coupling members in the form of end caps 12 and 14 at opposite ends of the device, each end cap 12 and 14 including a generally cylindrical body 16, an externally threaded projecting end 18 and an internally threaded cavity 20. External circumferentially extending flanges 22 are located intermediately of the body of each end cap, and the upper end cap 12 has an externally threaded surface 24 on the body extending beneath the flange 22 while the lower end cap 14 is provided with a seal element 26 captured between the flange 22 and rib 28 on the external surface of the body above the flange 22. A smooth surface portion 30 of reduced diameter is formed on the external surface of the upper end of the body 14 above the rib 28.

In order to determine the shear or rupture limits of the shear device, an elongated shear rod 34 extends between the end caps 12 and 14 and includes an upper, externally threaded end 36 threadedly engageable with the internally threaded portion 29 of the end cap 12, and a lower externally threaded end portion 38 is threadedly engageable with the internally threaded portion 20 of the lower end cap 14. The shear rod proper includes upper and lower rod sections 40 and 42 and an intermediate shearable section 44 of reduced diameter. The rod 34 is preferably of one-piece construction as illustrated and formed out of a high strength steel, such as a 10–20 steel with the intermediate section 44 of a predetermined, reduced diameter which will selectively weaken the rod so as to rupture at the intermediate section when a predetermined longitudinal or tensile load is applied thereto.

An outer elongated stabilizing sleeve or shroud 48 includes an upper internally threaded end surface 50 which threadedly engages the surface portion 24 on the upper end cap 12. However, the lower end of the sleeve 48 is of a slightly increased diameter in relation to the wall thickness of the sleeve so as to permit direct axial insertion of the lower end cap upwardly into the lower end 52. When fully inserted into the lower end 52, the flange 22 will abut the lower edges of the end 52; and, when the end 52 is fully seated against the flange 22, will effect a sealed engagement with the external annular seal 26 on the body 14 so as to prevent entry of moisture into the interior of the shear device when suspended from a sandline into a subsurface well. Similarly, the upper threaded end 50 when fully threaded onto the lower end 24 of the end cap 12 will become firmly seated against the upper flange 22 and, with the aid of another annular external seal 23, will prevent entry of liquid between the upper end cap 12 and the sleeve 48. In assembled relation as described, the upper end of the sleeve 48 is of course positively attached to the upper end cap 12 while the lower end 52 is axially slidable with respect to the lower end cap 14 so that any axially or longitudinally directed load applied to the shear device is fully absorbed by the shear rod 34 and not by the outer sleeve 48 while stabilizing the shear rod to prevent any bending or lateral distortion of the rod.

FIG. 3 illustrates the manner of assembly of the shear device 10 in end-to-end relation to a fishing tool F and lower end of the rod bar R. Specifically, each of the projecting ends 18 of the upper and lower end caps 12 and 14, respectively, are inserted into internally threaded sockets or boxes of the rod jar R and fishing tool F. In retrieving a tool that has become stuck in the well, the tool F is run down the production string by the sandline S. In the event that the fishing tool F should become stuck, it is necessary to apply an upwardly directed, longitudinally applied force or load to free the tool. The rupturable section 44 is designed with a predetermined shear limit such that the load applied cannot exceed a predetermined force level. If that force level is exceeded, the shear rod will rupture at the section 44 so that the lower rod section 42 will remain with the fishing tool F while the upper rod section 40 can be withdrawn from the well by the sandline S along with the outer sleeve 48 and remainder of the tool assembly T. The portion of the shear device 10 left in the hole can then be fished with rods and a polish rod fishing tool, or the tubing can be pulled to the "fish" and the equipment inside the tubing can be stripped out. When broken or ruptured, the shear rod 34 can be replaced in the shear device and the other parts reassembled as described. Again, shear rods 34 having different shear limits are insertable into the shear device 10 according to the maximum load to be absorbed by the sandline.

DETAILED DESCRIPTION OF MODIFIED FORM OF INVENTION

Figure 5:
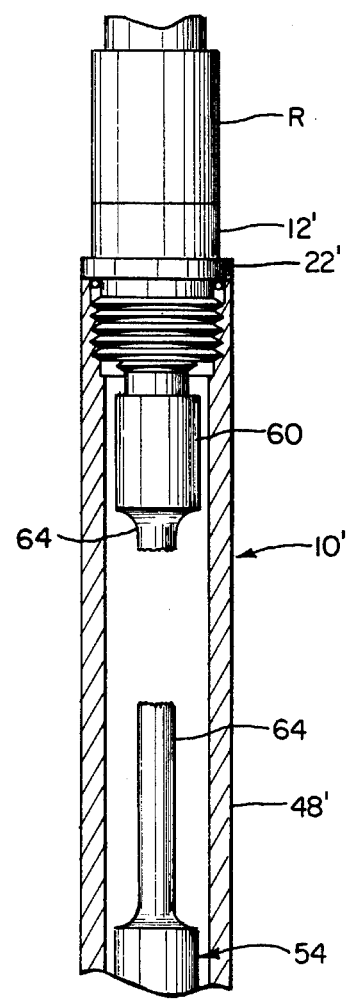
FIG. 5 is another view of the modified form partially in section illustrating the shear device when ruptured.

A modified form of invention is illustrated in FIGS. 4 and 5 in which like parts to those of FIGS. 1 to 3 are correspondingly enumerated with prime numerals. The modified form of well service tool is assembled in the same manner as illustrated and described in relation to the tool of FIG. 1 with a rod fishing tool F, weighted members or sinker bars B, and rod jars R with the shear device 10' inserted between the rod jars R and fishing tool F. Again, the tool is inserted through a production string by means of the sandline S, and the shear device 10' is so constructed and arranged as to rupture under a predetermined tensile load to avoid excessive strains or loads on the sandline S. In this way the sandline S, sinker bar B, and rod jar R can be retrieved along with portions of the shear device 10' as will be described.

Referring to FIGS. 4 and 5, the shear device 10' is comprised of end caps 12' and 14' at opposite ends of the device, each end cap 12' and 14' including a cylindrical body 16' an externally threaded projecting end 18' and an internally threaded cavity 20'. External, circumferentially extending flanges 22' are disposed on the body of each end cap, and an externally threaded surface 24' on the body of the upper end cap 12' is disposed beneath the flange 22'. Seal elements 26' are captured between the flange 22' and rib 28' on the external surface of each end cap body.

In the modified form, an elongated shear rod 54 extends between the end caps 12' and 14', the rod 54 having an upper, externally threaded end 56 engaging the internally threaded end portion 20' of the end cap 12', and a lower externally threaded end portion 58 engages the internally threaded portion 20' of the lower end cap 14' as in the preferred form. However, the shear rod 54 includes an upper shortened rod section 60 and a lower elongated rod section 62 with an intermediate shearable section 64 of reduced diameter located relatively near the upper end 56 and away from the lower end portion 58. In other words, the shearable section 64 is offset with respect to the length of the rod 54 so as to be relatively near the upper end; and the shear section 64 is of a predetermined, reduced diameter which will selectively weaken the rod so as to rupture along the shearable section 64 when a tensile load is applied exceeding its predetermined limit. Nevertheless, when the rod 54 is ruptured at the section 64, the lower rod section 62 is of sufficient length that it can be engaged by a fishing tool for retrieval from the well as in the preferred form. Accordingly, the overall length of the rod 54 may be reduced with respect to that of the preferred form and nevertheless have the same retrieval characteristics. Moreover, if desired, the shearable section 64 may be of increased length with respect to that of the preferred form but the overall length of the rod 54 is reduced as described.

A stabilizing sleeve 48' is constructed and arranged with respect to the upper and lower end caps 12' and 14' as in the preferred form so as to threadedly engage only the upper end cap 12' so that any longitudinally directed load is absorbed by the shear rod 54 and not by the outer sleeve 48' and therefore will be retrieved along with the upper end cap 12', in the event of rupture, and leave the lower rod section 62 exposed.

In assembling the end caps 12' and 14' onto the externally threaded ends 56 and 58 of the rod 54, nylon plugs 70 are inserted into bores 72 in each of the threaded ends 56 and 58 in pressfit relation thereto and in such a way that an end of each plug 70 is slightly exposed to frictionally engage the internally threaded socket portions 20' of the end caps 12' and 14' thereby effectively locking the end caps in place once threaded onto the end portions 56 and 58. Each plug is slightly cut by the female threading of the sockets 20' during make-up so as to serve as an indicator that the shear rod 54 has been made up in the past to prevent inadvertent reuse of a shear rod 54 that is intended only for one-time use.

FIG. 5 illustrates the interrelationship between the elements comprising the shear device 10' in the event of rupture at the shearable section 64 and specifically the manner in which the outer sleeve 68 remains attached to the upper end cap 12' while being separated from the lower end cap 14' thereby assuring that the sleeve 68 will be retrieved along with the upper end cap 12' while leaving the lower rod section 62 exposed to facilitate grasping by a fishing tool. In particular, the threaded engagement between the sleeve 68 and upper end cap 12' will assure that the sleeve remains attached to the upper end cap 12' when the sandline S is removed notwithstanding any interference from foreign materials or obstructions in the well which would tend to separate the sleeve 68 from the upper end cap 12' if not so attached.

It is therefore to be understood that while preferred and modified forms of invention are herein set forth and described, various modifications and changes may be made therein without departing from the spirit and scope of the present invention as defined by the appended claims and reasonable equivalents thereof.

I claim:

1. In a well service tool assembly having a fishing tool or the like for suspension from a sandline or the like to be inserted into a subsurface well, the improvement comprising:

a shear device inserted between the sandline and the fishing tool, said shear device including coupling members at opposite ends thereof, each of said coupling members having a rod-engaging portion, said shear device including a shear rod and an outer elongated sleeve member interposed between said coupling members in surrounding relation to said shear rod, and said shear rod having opposite ends affixed to corresponding ones of said rod-engaging portions, said shear rod including a weakened portion which is rupturable under a predetermined tensile load to separate the fishing tool from the sandline, only an upper one of said coupling members including means positively attaching said upper coupling member to said sleeve whereby said sleeve remains attached to said upper coupling member and separated from a lower one of said coupling members when said upper coupling member is retrieved from the well in the event of rupture of said shear rod.

2. In a well service tool assembly according to claim 1, said shear rod being elongated, and said intermediate weakened section being of a reduced diameter in relation to the rest of said shear rod.

3. In la well service tool assembly according to claim .1, a plurality of shear rods, each having a different shear strength, said rods being interchangeably connected to said rod engaging portion.

4. In a well service tool assembly having a fishing tool or the like for suspension from a sandline or the like to be inserted into a subsurface well, the improvement comprising:

a shear device inserted between the sandline and the fishing tool, said shear device including coupling members at opposite ends thereof, each of said coupling members having an internal rod-engaging portion, said shear device including an elongated shear rod and an outer elongated sleeve member interposed between said coupling members in surrounding relation to said shear rod, and seal means for sealing opposite ends of said sleeve to said coupling members, wherein only one of said coupling members is positively attached to said sleeve; and said elongated shear rod having opposite ends affixed to said rod-engaging portions, said shear rod including a weakened portion relatively near one of said opposite ends and away from the other of said opposite ends and having a predetermined shear strength which is rupturable under a predetermined load to separate the fishing tool from the sandline.

5. In a well service tool assembly according to claim 4, said shear rod being elongated, and said intermediate weakened section being of a reduced diameter in relation to said shear rod.

6. In a well service tool assembly according to claim 5, there being a plurality of elongated shear rods, each having an intermediate weakened section of a different shear strength, each of said shear rods being interchangeably connectable between said rod-engaging portions.

7. A shear device disposable in a conduit inserted into a producing oil or gas well for separating said conduit at a predetermined location when an excessive tensile load is applied thereto, said shear device comprising:
- a pair of coupling members at opposite ends of said shear device connectable to said conduits, each of said coupling members having an internal rod-engaging portion;
- an outer elongated sleeve member interposed between said coupling members and in sealed relation thereto, only an upper one of said coupling members being positively attached to said sleeve; and
- an elongated shear rod having opposite ends affixed to said rod-engaging portions, and a shear section of a reduced diameter relatively near an upper one of said opposite ends and away from a lower one of said opposite ends, said shear section being rupturable under a predetermined tensile load to separate said conduits at said predetermined location.

8. A shear device according to claim 7, said outer sleeve disposed in outer concentric relation to said rod and being slidable independently of said rod between said coupling members.

9. In a well service tool for disposition within a subterranean well, the improvement comprising:
- a shear device including an elongated shear rod, first and second coupling members, and a sleeve;
- said shear rod disposed substantially within said sleeve and substantially longitudinally within the well and including an intermediate, weakened portion of reduced diameter in relation to the rest of said rod which is rupturable under a predetermined tensile load, the upper end of said rod attached to said first coupling member and the lower end of said rod threadedly attached to said second coupling member; and
- said first coupling member being threadedly attached to said sleeve, whereby when said shear rod ruptures, said first coupling member, said sleeve, and the upper portion of said rod are attached together and may be simultaneously withdrawn from the well.

10. In a well service tool according to claim 9 wherein said rod is substantially entirely disposed within said sleeve.

11. In a well service tool according to claim 9, wherein opposite ends of said sleeve include seals in sealed engagement with said coupling members.

* * * * *